(12) United States Patent
Heileg et al.

(10) Patent No.: US 6,564,753 B1
(45) Date of Patent: May 20, 2003

(54) LEG PROTECTING APPARATUS FOR AN ANIMAL

(76) Inventors: Robert L. Heileg, 2377 Bob White Ct., Grand Rapids, MI (US) 49546; Gregory P. Mott, 2626 Greentree Dr. SE., Grand Rapids, MI (US) 49546

( * ) Notice: Subject to any disclaimer, the term of this patent is extended or adjusted under 35 U.S.C. 154(b) by 0 days.

(21) Appl. No.: 10/212,683

(22) Filed: Aug. 6, 2002

(51) Int. Cl.[7] .............................................. A01K 13/00
(52) U.S. Cl. ..................................... 119/850; 119/817
(58) Field of Search ................................ 119/850, 851, 119/856, 817, 818; 36/2 R, 111; D30/145; 128/881, 882, 888, 892

(56) References Cited

U.S. PATENT DOCUMENTS

| | | | | |
|---|---|---|---|---|
| 353,428 A | * | 11/1886 | Purson ............................ | 168/2 |
| 510,337 A | * | 12/1893 | Glascock ........................ | 54/72 |
| 686,338 A | * | 11/1901 | Ready .......................... | 128/881 |
| 1,073,478 A | * | 9/1913 | Dodd .......................... | 128/881 |
| 2,253,837 A | * | 8/1941 | Auspurger ..................... | 168/2 |
| 3,209,516 A | * | 10/1965 | Hyman ........................... | 54/82 |
| 3,791,383 A | | 2/1974 | Friedman | |
| 4,479,457 A | | 10/1984 | Rotolo | |
| 4,744,333 A | | 5/1988 | Taylor | |
| 5,033,124 A | * | 7/1991 | Bucalo et al. ................. | 2/227 |
| 5,076,043 A | | 12/1991 | Butler | |
| 5,341,765 A | | 8/1994 | McComb | |
| D375,586 S | | 11/1996 | Caditz | |
| D376,448 S | | 12/1996 | Caditz | |
| 5,634,437 A | * | 6/1997 | Petersen ...................... | 119/714 |
| 5,676,095 A | | 10/1997 | Ralls | |
| 6,223,696 B1 | | 5/2001 | Murakami | |
| 6,240,882 B1 | | 6/2001 | Gross | |

* cited by examiner

*Primary Examiner*—Yvonne Abbott
(74) *Attorney, Agent, or Firm*—Dale J. Ream

(57) ABSTRACT

An apparatus for protecting the front legs of an animal includes a padded base member formed to rest upon the back and shoulders of the animal. The apparatus includes a pair of elongate straps, an elbow wrap being attached to an end of each strap. Each elbow wrap includes a flexible sheet of material with opposed side edges. Hook and loop fasteners are mounted along the opposed side edges on opposite surfaces of the sheet such that the sheet may be wrapped and secured about the animals elbow. An elastic strap is attached to each elbow wrap and may be releasably coupled to the base member after the elbow wrap is secured to the animal's elbow. The apparatus includes a collar tethered to the base member which may be fitted around the animal's neck. This maintains the base member and leg wraps in position.

13 Claims, 5 Drawing Sheets

LEG PROTECTING APPARATUS FOR AN ANIMAL

BACKGROUND OF THE INVENTION

This invention relates generally to leg protection devices for animals and, more particularly, to an apparatus for protecting the elbows of an animal's front legs.

An animal's front leg elbows are mostly bone and, as such, do not have very much muscle or tissue surrounding them for protection. Thus, animals frequently develop calluses, sores, or wounds on their front leg elbows. Unless bandaged or otherwise covered, these maladies are very slow to heal. In fact, calluses or sores may continually come back due to lying on hard surfaces.

Various bandages and protective garments have been proposed in the prior art for covering the legs of animals such as dogs. Although assumably effective in use, the existing leg protection devices are not reliably held in position or are not convenient to secure to an animal.

Therefore, it is desirable to have an animal leg protection apparatus that cannot be easily displaced from its proper position once secured to an animal. Further, it is desirable to have an animal leg protection apparatus that may be securely positioned after first wrapping its leg wraps around an animal's elbows.

SUMMARY OF THE INVENTION

A leg protection apparatus for an animal according to a preferred embodiment of the present invention includes a pair of elbow wraps. Each elbow wrap is a sheet of a flexible material that may be wrapped around the elbow of an animal's front leg and fastened thereabout with hook and loop fasteners. An elastic strap is fixedly attached to each leg wrap and includes an end with a fastener. The apparatus also includes a padded base member that is formed to rest upon the back and shoulders of the animal. A pair of brackets are mounted atop this base member. The base member is tethered to a conventional pet collar which fits around an animal's neck—holding the base member in a relatively fixed position. Once a leg wrap has been wrapped around the elbow of an animal's front leg, the elastic strap may be stretched upwardly until the strap fastener engages a corresponding bracket on the base member. Once both straps are releasably secured to the base member, the leg wraps will stay in position without regard to any activity of the animal.

Therefore, a general object of this invention is to provide a leg protection apparatus for animals that will cover calluses or sores on the elbows of an animal's front legs.

Another object of this invention is to provide an apparatus, as aforesaid, which will remain properly positioned once secured to an animal.

Still another object of this invention is to provide an apparatus, as aforesaid, which cannot be easily pulled off by the animal.

Yet another object of this invention is to provide an apparatus, as aforesaid, that is flexible and comfortable to an animal.

A further object of this invention is to provide an apparatus, as aforesaid, that is durable.

Other objects and advantages of this invention will become apparent from the following description taken in connection with the accompanying drawings, wherein is set forth by way of illustration and example, embodiments of this invention.

DESCRIPTION OF THE PREFERRED EMBODIMENT

Figure 1:
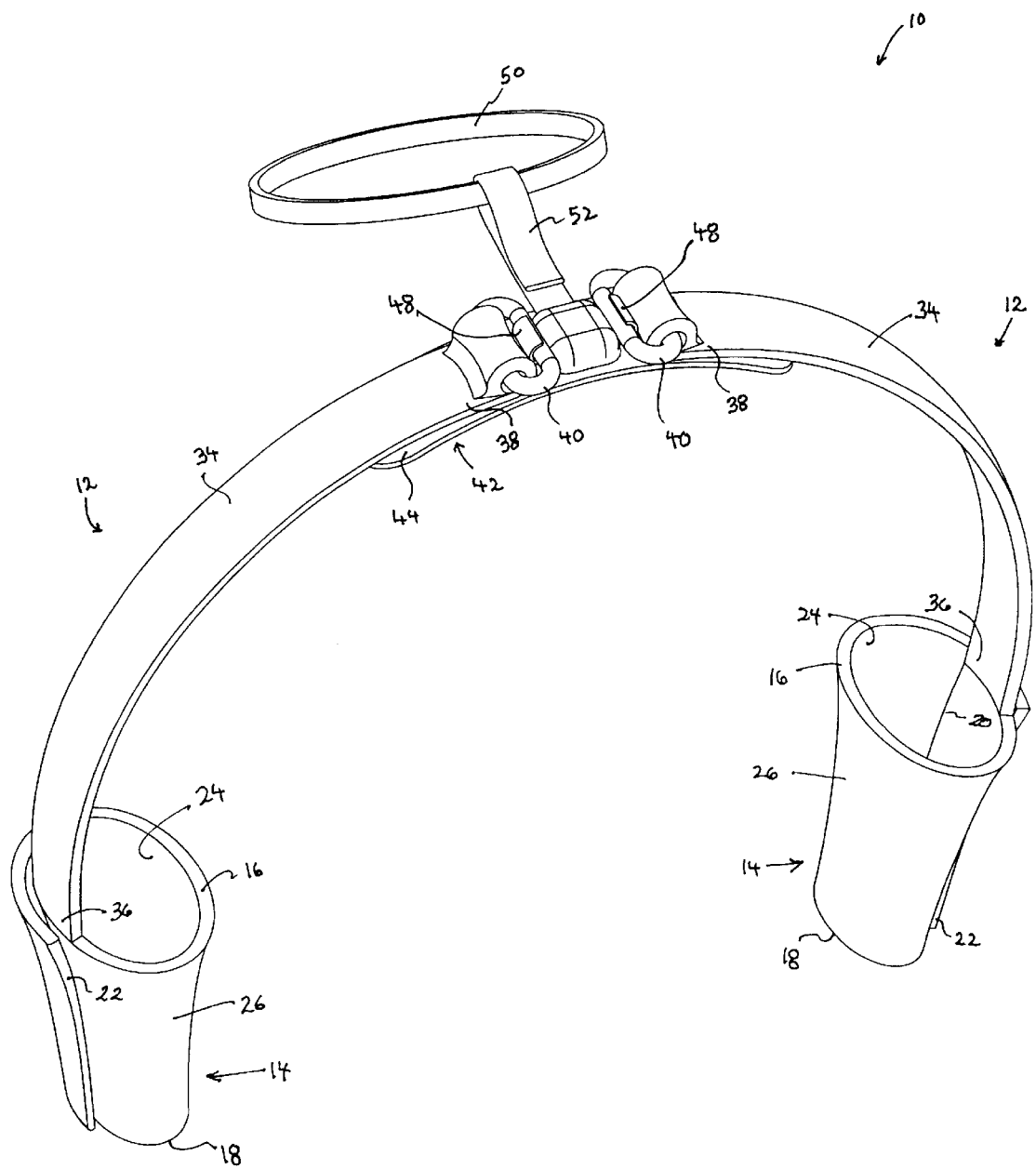
FIG. 1 is a perspective of a leg protection apparatus according to a preferred embodiment of the present invention.

A leg protecting apparatus 10 according to one embodiment of the present invention will now be described in detail with reference to FIGS. 1 through 4 of the accompanying drawings. The leg protecting apparatus 10 includes a pair of leg guard portions 12 that may be selectively and releasably coupled to a base member 42 (FIG. 1).

Figure 3:
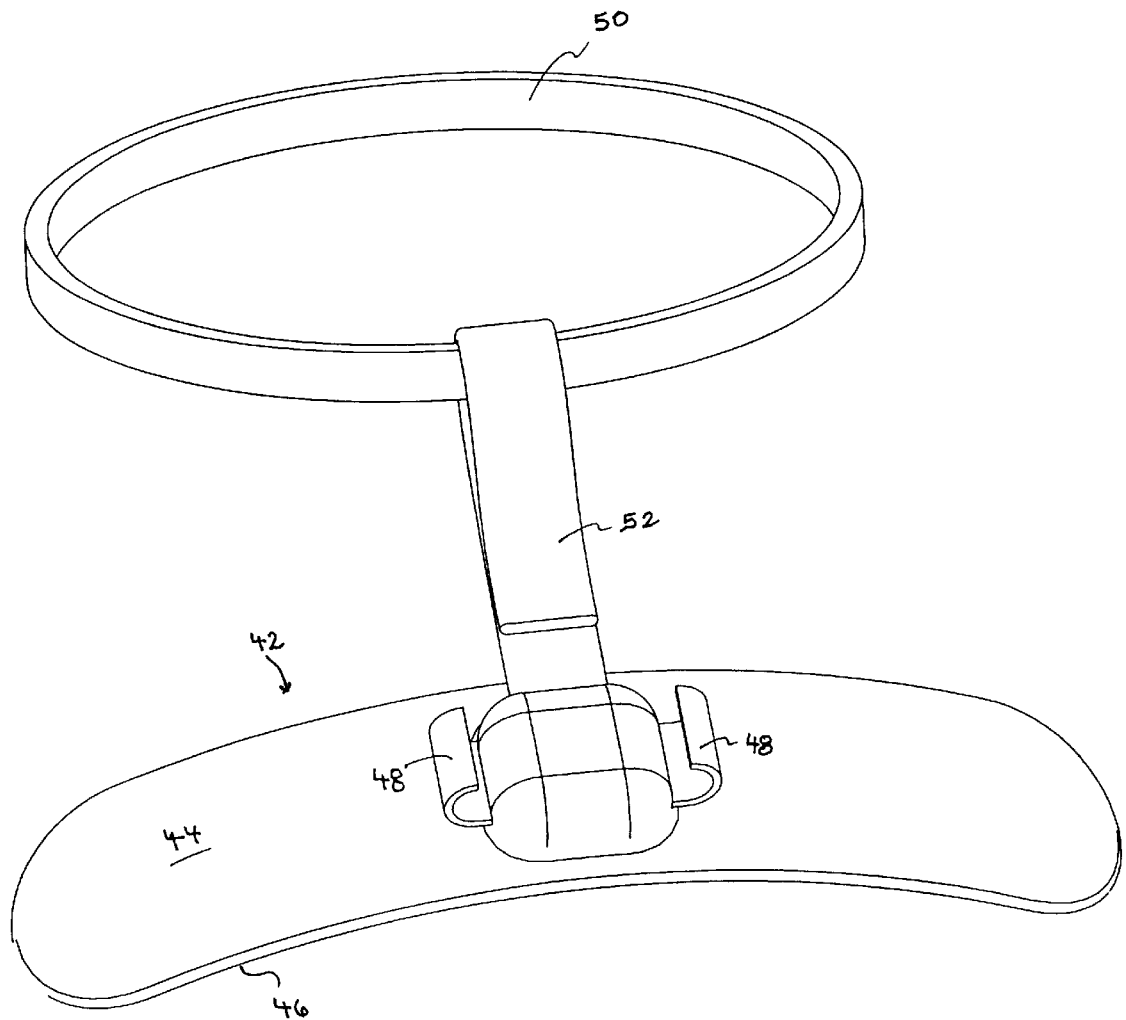
FIG. 3. is a perspective view of the base member and collar as in FIG. 1 on an enlarged scale.

More particularly, the base member 42 is formed of a padding material and includes top 44 and bottom 46 surfaces although it would be suitable for only the bottom surface to be padded. The base member 42 includes a generally rectangular shape for resting comfortably upon the back and shoulders of an animal, such as a dog. A pair of generally C-shaped brackets 48 are mounted atop the top surface 44 of the base member 42, their use being further described below. A collar 50 having a conventional construction is connected to the base member 42 with a flexible tether 52 or strap (FIG. 3). Thus, the collar 50 may be fitted around the neck of the animal such that the base member 42 is held in its general position on the back of the animal.

Figure 2:
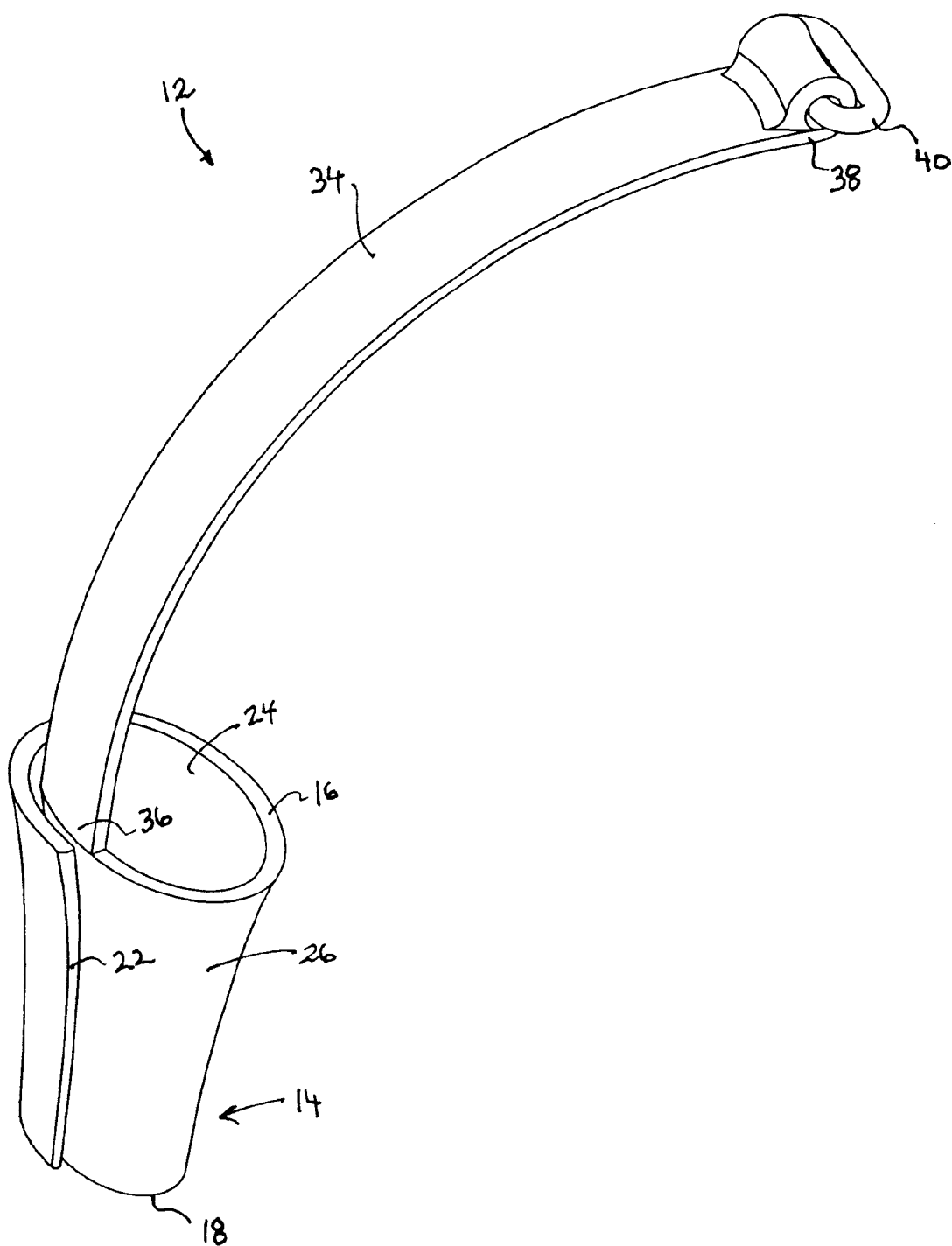
FIG. 2 is a perspective view of the of a leg guard portion portion as in FIG. 1 removed from the apparatus.
Figure 4:
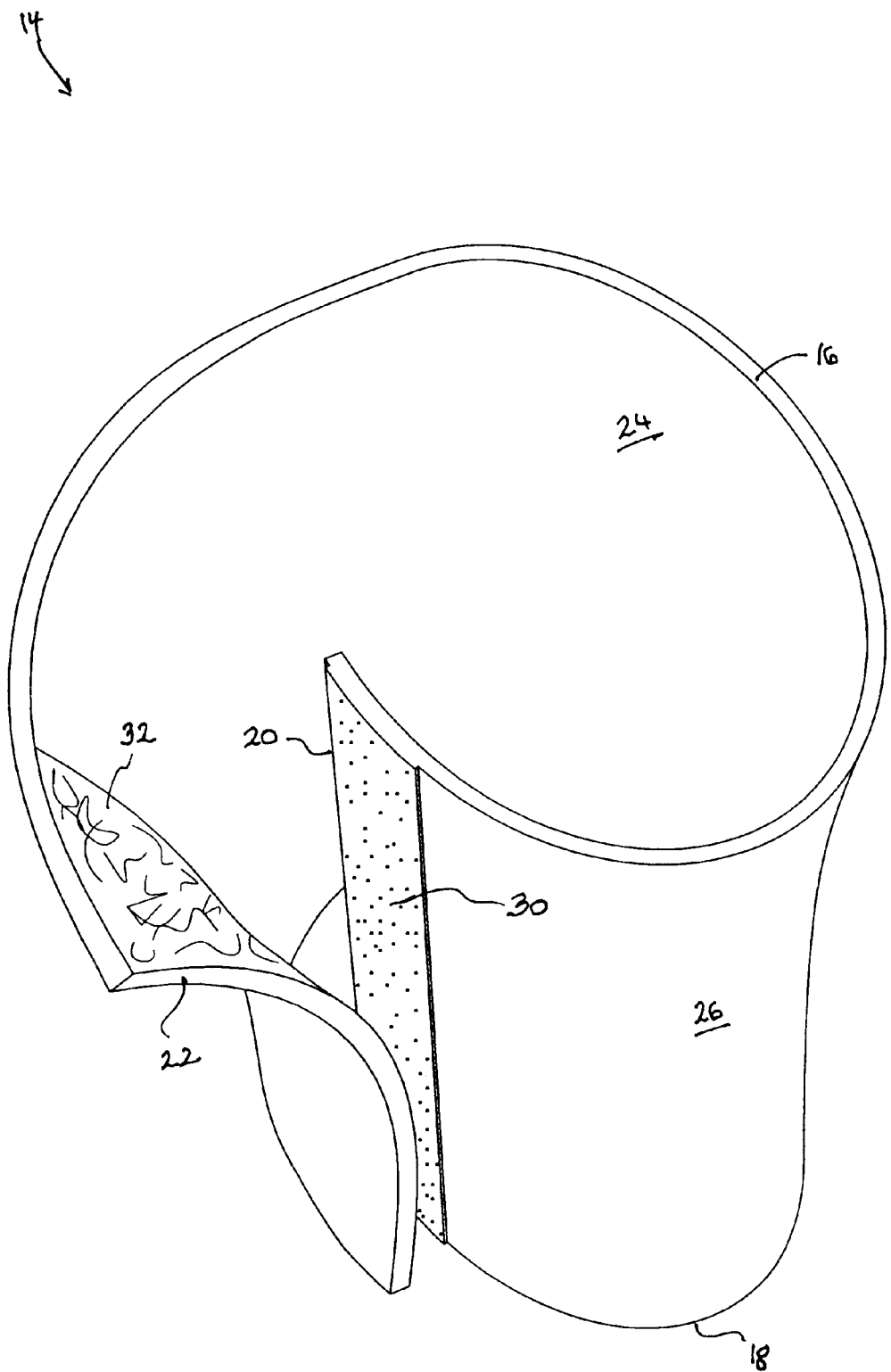
FIG. 4 is an isolated view of a leg wrap of the apparatus as in FIG. 1 on an enlarged scale.

Each leg guard portion 12 includes a leg wrap 14 (FIG. 2). Each leg wrap 14 includes a generally rectangular sheet constructed of a durable, flexible material such as polychloroprene. Polychloroprene is a durable, waterproof, rubber-like material that comfortably conforms to whatever it is wrapped about. Each leg wrap 14 includes upper 16 and lower 18 longitudinal edges with first 20 and second 22 side edges extending between the upper and lower longitudinal edges. Each leg wrap 14 further includes inner 24 and outer 26 surfaces. A strip 30 of one hook and loop fastening material is mounted to the outer surface 26 of each leg wrap 14 along its first side edge 20 (FIG. 4). Another strip 32 of a hook and loop fastening material is mounted to the inner surface 24 of each leg wrap 14 along its second side edge 22. Therefore, the two strips 30, 32 of hook and loop fasteners overlap and engage one another when a leg wrap 14 is wrapped around the elbow of an animal's leg.

A first end 36 of an elongate strap 34 is fixedly attached to an upper longitudinal edge 16 of each leg wrap 14, each strap 34 including an opposed second/free end 38. Each strap 34 is constructed of an elastic material such that it may be moderately stretched while maintaining a natural tension or and resilience. A D-ring 40 fastener is coupled to each strap free end 38 although snap fasteners, clips, or the like would also be suitable fasteners. The D-rings 40 are configured such that they may be selectively hooked to respective brackets 48 so as to couple the leg portions 12 to the base member 42. Of course, the brackets 48 may be configured to receive the D-rings 40 in a friction-fit or snappable relationship.

In use, the collar 50 may be placed around the neck of an animal, such as a dog, in conventional fashion such that the base member rests upon the back and shoulders of the animal and is maintained in that general position. Then, the leg wraps 14 may be positioned about the elbows of the animal's front legs and secured thereto with the hook and loop fastening strips. The elastic straps 34 connected to the leg wraps 14 may then be stretched upwardly and corresponding D-rings 40 may be coupled to corresponding brackets 48 on the base member 42. The sequence of attachment provided by the present apparatus is important in that calluses or sores on the animal's elbows may be treated and wrapped independently prior to attaching a leg portion strap 34 to the rest of the apparatus 10. This provides the greatest comfort to the animal and greatest convenience to the human user.

Figure 5:
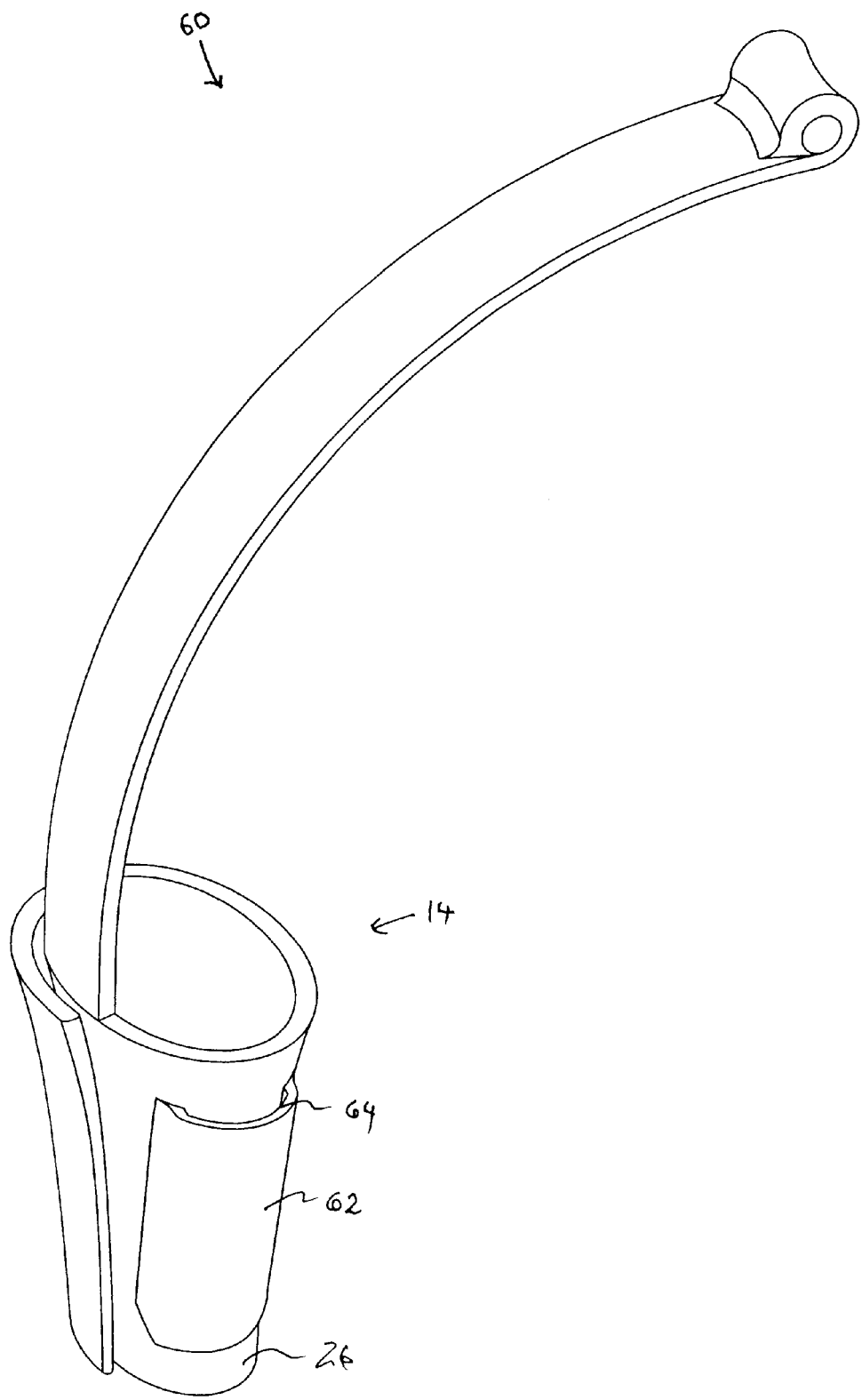
FIG. 5 is a perspective view of a leg protecting apparatus according to another embodiment of the invention.

A leg protecting apparatus 60 according to another embodiment is shown in FIG. 5 and includes a construction substantially similar to the construction described above except as specifically noted below. The leg protecting apparatus 60 includes a pocket 62 attached to an outer surface 26 of each leg wrap 14. Each pocket 62 presents a generally square configuration and includes one open edge 64 such that extra bandages or other wound dressing supplies may be received therein.

It is understood that while certain forms of this invention have been illustrated and described, it is not limited thereto except insofar as such limitations are included in the following claims and allowable functional equivalents thereof.

Having thus described the invention, what is claimed as new and desired to be secured by Letters Patent is as follows:

1. An apparatus for protecting the front legs of an animal, comprising:
    a base member fitted to rest upon the back and shoulders of the animal;
    a pair of leg guard portions, each leg guard portion including an elbow wrap fittable about the elbow of an animal and an elastic strap having a first end fixedly attached to said elbow wrap and an opposed free end; and
    means for releasably coupling respective free ends to said base member, whereby said straps may be coupled to said base member after said elbow wraps are fitted about the elbows of the animal.

2. The apparatus as in claim 1 wherein said coupling means includes:
    a pair of C-shaped brackets mounted atop said base member;
    a pair of D-ring fasteners attached to said free ends of respective elastic straps for selectively mating with respective C-shaped brackets.

3. The apparatus as in claim 1 wherein said base member is constructed of a padded material.

4. The apparatus as in claim 1 wherein each leg wrap comprises:
    a sheet formed of a flexible material having inner and outer surfaces with opposed first and second side edges;
    one of a hook and loop fastening material mounted to said outer surface along said first side edge;
    another of a hook and loop fastening material mounted to said inner surface along said second side edge, whereby said sheet may be secured about the elbow of the animal by selectively engaging respective hook and loop fastening materials.

5. The apparatus as in claim 4 wherein said flexible material is polychloroprene.

6. The apparatus as in claim 4 further comprising a collar fittable about a neck of the animal and a tether connecting said collar to said base member.

7. The apparatus as in claim 1 further comprising a collar fittable about a neck of the animal and a tether connecting said collar to said base member.

8. The apparatus as in claim 4 further comprising a pair of storage pockets mounted to said outer surfaces of respective sheets for holding wound dressing articles.

9. An apparatus for protecting the front legs of an animal, comprising:
    a base member fitted to rest upon the back and shoulders of an animal, said base member having bottom and top surfaces;
    a pair of spaced apart brackets mounted to said top surface of said base member;
    a pair of elbow wraps, each elbow wrap being formed of a flexible material and having a generally rectangular configuration, each elbow wrap having inner and outer surfaces and upper and lower longitudinal edges extending therealong with first and second side edges extending between said upper and lower longitudinal edges;
    one of a hook and loop fastening material mounted to said outer surface along said first side edge;
    another of a hook and loop fastening material mounted to said inner surface along said second side edge, whereby said sheet may be secured about the elbow of the animal by selectively engaging respective hook and loop fastening materials;
    a pair of elongate straps formed of an elastic material, each strap having a first end attached to a respective upper longitudinal edge of a respective elbow wrap and having an opposed free end; and
    a pair of fasteners attached to respective free ends of said pair of straps for releasably coupling said straps to said base member by selectively engaging said fasteners and said brackets.

10. The apparatus as in claim 9 wherein:
    said pair of brackets include generally C-shaped configurations defining open sides thereof facing one another;
    said pair of fasteners are D-rings configured to selectively mate with respective brackets; and
    said bottom surface of said base member is formed of a padded material.

11. The apparatus as in claim 9 wherein said flexible material of said pair of elbow wraps is polychloroprene.

12. The apparatus as in claim 9 further comprising:
    a collar fittable around a neck of the animal; and
    a tether having a first end attached to said base member and a second end attached to said collar, whereby said base member, said pair of elbow wraps, and said pair of straps are held in position relative to the animal's neck when said fasteners are coupled to said brackets.

13. The apparatus as in claim 9 further comprising a pair of storage pockets fixedly attached to said outer surfaces of respective elbow wraps, each pocket defining an opening adjacent one edge thereof for receiving wound dressing articles therein.

\* \* \* \* \*